United States Patent [19]

Billingsley et al.

[11] Patent Number: 4,470,151
[45] Date of Patent: Sep. 4, 1984

[54] IMAGE MOTION AND DISTORTION STABILIZATION FOR PREDETECTION SCENE INFORMATION PROCESSING SENSORS

[75] Inventors: James D. Billingsley, Arlington; Donald T. Cottingham, Dallas, both of Tex.

[73] Assignee: The LTV Aerospace and Defense Co., Dallas, Tex.

[21] Appl. No.: 295,925

[22] Filed: Aug. 24, 1981

[51] Int. Cl.³ .......................... H01J 31/50; G06K 9/32
[52] U.S. Cl. ........................................ 382/44; 250/342; 358/125; 358/222
[58] Field of Search ............ 350/96.15, 96.16, 331 R, 350/331 T, 351, 353, 500; 358/23, 25, 53, 63, 103, 113, 125, 126, 222; 382/1, 44, 58; 250/203 R, 208, 578, 338, 342, 347; 364/455, 516, 559, 571, 731

[56] References Cited

U.S. PATENT DOCUMENTS

| | | | |
|---|---|---|---|
| 3,484,722 | 12/1969 | Barker, Jr. et al. | 350/353 |
| 3,577,205 | 5/1971 | Hobrough | 358/222 |
| 3,622,788 | 11/1971 | Briggs | 358/125 |
| 3,783,271 | 1/1974 | Abbott, Jr. et al. | 250/342 |
| 4,040,047 | 8/1977 | Hareng et al. | 350/351 |
| 4,040,087 | 8/1977 | Hall | 358/222 |
| 4,189,747 | 2/1980 | Funari | 250/342 |
| 4,262,198 | 4/1981 | Gupta et al. | 350/353 |
| 4,270,143 | 5/1981 | Morris | 358/125 |
| 4,283,113 | 8/1981 | Eden | 350/96.15 |
| 4,388,646 | 6/1983 | Strother | 358/125 |

Primary Examiner—Leo H. Boudreau
Attorney, Agent, or Firm—James M. Cate; S. S. Sadacca

[57] ABSTRACT

The specification discloses a method and apparatus for stabilizing images in the reference frame of a forward or down looking infrared receiver moving relative to the scene. An infrared modulator (14) is disposed in the image plane of the receiver for imaging infrared energy from the scene. The modulator (14), normally nonreflecting of infrared energy incident thereon, is capable of having reflective spots written on selected locations thereon to reflect infrared energy incident at those locations. Detectors (24) positioned to detect infrared energy reflected from the modulator provide an output signal representing the radiance values of the sampled scene element. A microprocessor (30) is connected to the detector, responsive to the detected output signal, to detect image motion caused by relative motion between the receiver and the scene from the detected information. The microprocessor (30) provides transform information about the transformation from reference frame to modulator coordinates such that infrared energy reflected from the modulator will appear stabilized to a sampling frame in the computer during relative motion between the telescope and the scene. Interface electronics (32) connected to the microprocessor (30) converts selected sampling points in the window frame coordinates to modulator coordinates at which coordinates an electron gun (21) writes reflective spots on the modulator.

22 Claims, 6 Drawing Figures

IMAGE MOTION AND DISTORTION STABILIZATION FOR PREDETECTION SCENE INFORMATION PROCESSING SENSORS

TECHNICAL FIELD

The invention pertains to methods and apparatus for electronically stabilizing images observed in the focal plane of a sensor under conditions of relative motion between the sensor and the object, and more particularly to methods and apparatus for stabilizing images for predetection scene processing in forward looking and down looking infrared receivers.

BACKGROUND ART

In conventional sensors in which the image of a scene is focused on the detector plane, rotation or translational movement of the sensor causes the image of the scene to move and distort relative to the detector. Under such conditions, a fixed reference frame in the scene is not a fixed reference frame in the image plane. To compensate for image motion to prevent blur, conventional sensors must sample scene information at very high frame rates. The greater the sensor motion, the higher the frame rate must be with concomitant greater bandwidth requirements.

A major disadvantage of using fast frame rates is that scene frames lose their value quickly since they cannot easily be correlated with new frames having different distortion. Physical stabilization of the sensor line of sight has been attempted with only partial success. Such stabilization corrects for only part of the image motion, the part in the near vicinity of the relative velocity vector or the track point in the scene. This procedure makes the useful field of view small and increasingly smaller at higher relative velocities. Therefore, a need arises for a method and apparatus for stabilizing images in a sampling coordinate frame in a computer to compensate for relative motion between the object and the sensor.

DISCLOSURE OF THE INVENTION

In accordance with the present invention, apparatus is disclosed for stabilizing the image of a scene being viewed by a forward or down looking infrared receiver moving relative to the scene. An infrared modulator is disposed in the image plane of the receiver for imaging infrared energy from the scene. The modulator is normally nonreflecting to infrared energy incident thereon, but is capable of having reflecting spots written at selected locations thereon to reflect infrared energy incident at those locations. Detectors positioned to detect motion of the image on the modulator caused by infrared energy reflected from the modulator provide an output signal representative of the radiance of the sampled scene element. A microprocessor is connected to the detector, responsive to the detected output signal to detect motion of the image on the modulator caused by relative motion between the receiver and the scene from the detected information. The microprocessor provides a signal indicative of the sampling coordinates on the modulator from which infrared energy reflected from the modulator will appear stabilized to a sampling frame in the computer during relative motion between the telescope and the scene. Control means responsive to the microprocessor converts selected sampling points in the window frame coordinates to modulator coordinates and directs a cathode ray tube to write reflective spots on the modulator at the modulator coordinates.

In accordance with another aspect of the invention, a method is disclosed for stabilizing the image of a forward or down looking infrared receiver moving relative to the scene being viewed. Radiance values derived from the last set of observations made of the scene are stored. A current set of radiance values corresponding to selected points in the scene is obtained by rapidly writing a series of reflecting spots on a thermoptic modulator. The time rate of change of the radiance values is determined by comparing current radiance values with stored radiance values from the preceding set of observations. The spatial rate of change of the current radiance values is then determined from the current radiance values. The time and spatial rates of change of the radiance values are then processed to determine transform values representing the motion of the image caused by relative motion between the telescope and the scene. A set of sample points having coordinates in the window frame is then transformed into modulator coordinates such that a scene element reflected from the modulator at these modulator coordinates will appear stabilized in the window frame during relative motion between the telescope and the scene.

BRIEF DESCRIPTION OF DRAWINGS

For a more complete understanding of the present invention and for other obvious advantages thereof, reference is now made to the following description, taken in conjunction with the accompanying drawing in which.

DETAILED DESCRIPTION

The emerging technology of thermoptic materials has made possible a variety of new light control devices which have particular application in forward and down looking infrared sensors. The physical phenomenon on which the thermoptic technology is based is the sudden change in optical properties of certain materials at specific phase transition temperatures. For thermoptic materials such as vanadium dioxide ($VO_2$), the change in crystal structure from the monoclinic to rutile states is thermodynamically favored above the phase transition temperature with a consequent sudden change in optical properties which produce nonreflecting and reflecting states from a film stack. Switching times between states can be extremely short, on the order of nanoseconds. Reflecting spots can be written on these normally nonreflecting materials by inducing localized changes in temperature. By proper control of the ambient temperature, the spots can be maintained indefinitely or permitted to vanish rapidly after being written. Spot sizes have been written as small as five microns by lasers and as small as twenty microns by electron beam heating. Large area optical quality VO$_2$ film surfaces have been manufactured and programmable spots have been obtained using CRT tubes with thermoptic film faceplates. For further information about the optical properties of vanadium dioxide thin films and the use of such films as infrared modulators, reference is made to the copending application of Dayton D. Eden, Ser. No. 023,221, filed Mar. 23, 1979, entitled "Optical Modulation of Vanadium Oxide Thin Films", now issued as U.S. Pat. No. 4,283,113.

Infrared modulators using these new thermoptic materials have been constructed in which scene sampling patterns can be programmed in real time in the image plane to move and distort in exactly the same way as the image. The sampling spot in this electronically stabilized reference frame in a computer maintains its position in the scene for all sensor motions that do not move that part of the scene out of the field of the view. As a result, the true optical image is made to correspond mathematically to a sampling frame image that is not distorted, displaced or lost from the field of view. Since high frame speeds are not required, bandwidth requirements are accordingly reduced.

In the preferred embodiment, an infrared sensor may employ a programmable infrared modulator ahead of the detectors to perform a variety of optical processing functions on the incoming infrared scene image prior to detection. The modulator, placed in the focal plane of an infrared sensor, is capable of reflecting all or part of the infrared image falling on the modulator to an infrared detector when part or all of the modulator is switched to its reflecting (metal) state. In its normal (semiconductor) state, the modulator does not reflect infrared energy and infrared energy from the scene passes through or is absorbed by the modulator with minimum reflection. When the modulator is in its normal, nonreflecting state, the detectors have no view of the outside world. Such an arrangement is referred to as a "dark field" infrared telescope.

When information from the real world scene is desired, a localized spot of predetermined size is written at a desired location on the modulator. The optical path of the detector is thereby coupled with the optical path of the telescope by a reflecting spot which allows energy intercepted by the spot on the modulator to be reflected to the detectors. The location of the reflective spot on the modulator determines the location of the scene element to be sampled. The size of the spot, which can also be varied, determines the instantaneous field of view (IFOV) of the sensor, and therefore, the area of the scene to be sampled, which determines the resolution. Any part of the telescope viewable scene can thus be randomly accessed with any degree of resolution within the limits of the programmable spot size and the optical resolution limits of the infrared telescope.

Figure 1:
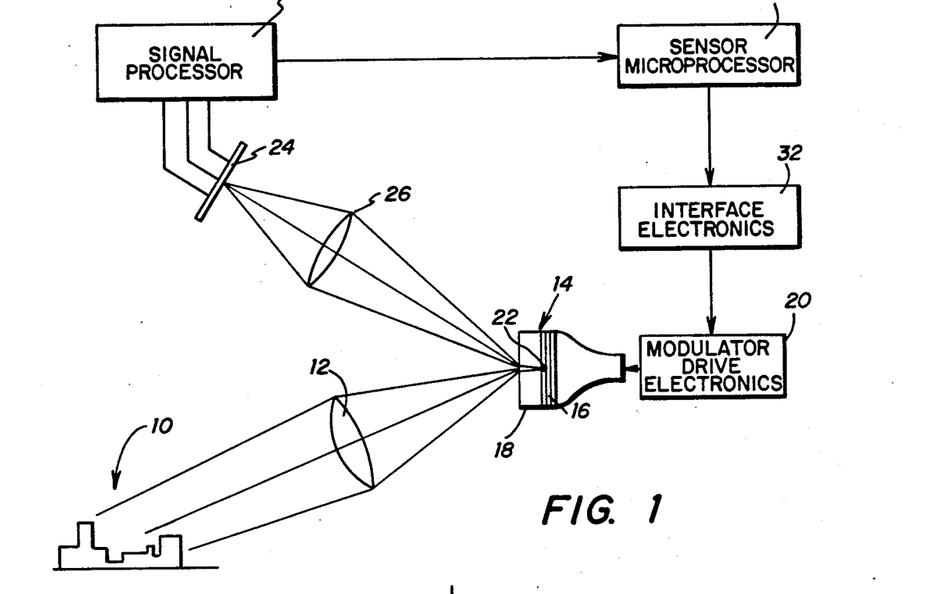
FIG. 1 is a schematic representation of the dark field telescope and the associated electronics.

FIG. 1 schematically illustrates the dark field telescope and the associated electronics employed in the image stabilization system. A scene 10 emitting thermal energy at wavelengths in the infrared region of the electromagnetic spectrum, is viewed through a lens 12 which focuses infrared radiation onto the faceplate of a thermoptic modulator 14. The modulator 14 contains a stack of thin films 16 disposed on a substrate material 18 at the faceplate thereof. Film stack 16, which is typically less than 5 microns in thickness, contains several layers of thin films, at least one of which is a phase transition material such as vanadium dioxide thin film, having a thickness typically about 2000 Å. The film stack is designed such that its reflective and nonreflective characteristics are optimized for operation at wavelengths in the range 0.4 to 12 microns by appropriate choices of the indices of refraction and the thicknesses of the films and substrate material. The film stack 16 is maintained at a temperature of about 50° C., which is about 15° below the transition temperature of the vanadium oxide thin film. At this temperature, reflective spots written on the faceplate of modulator 14 by localized heating decay rapidly as the heated region returns to ambient temperature. This permits a set of observations of the scene to be made by rapidly scanning a series of reflecting spots written at specific coordinates on the modulator.

The thermal emission of the entire scene 10 is therefore viewed at the faceplate of modulator 14. As the result of a command to the modulator drive electronics 20, a reflective spot of selected size is written at selected coordinates ($X_m$, $Y_m$) on the modulator to reflect the portion of the scene incident at the spot to the infrared detectors 24. The modulator drive electronics generates the necessary voltages to drive an electron gun or laser in the modulator of predetermined size to be directed at selected coordinates on the faceplate of modulator 14 at which point a reflecting spot 22 is written. In the preferred embodiment, a cathode ray tube with an electron gun and electrostatic deflecting plates or alternatively, an electromagnetic deflection coil, is employed in the thermoptic modulator. Alternatively, a scanable laser may also be used in place of an electron gun.

Detectors 24 generate a signal responsive to the intensity of the infrared photon flux or radiance values detected at coordinates ($X_m$, $Y_m$) on the modulator 14. Conventional infrared detectors, such as the indium antimonide detectors, have been employed for this purpose, and other detectors, such as lead selenide or mercury cadmium telluride, are also suitable, depending upon the wavelength at which the telescope is designed to operate. The detectors may be employed in an array to provide greater sensitivity and reduction of detector noise. To facilitate collection of the radiation reflected from the modulator, additional optics 26 may be provided between the modulator and the detectors.

The signals generated by detectors 24 are fed to a signal processor 28, where the signals are amplified and converted into digital form for processing by the sensor microprocessor 30. Such a signal processor may include conventional electronics such as preamplifiers, postamplifiers, filters and analog to digital converters. The digitized output signal of signal processor 28 is fed to the sensor microprocessor 30, which processes information about the radiance values observed at detectors 24 and which also controls the operation of the dark field telescope. For further details concerning the dark field telescope, reference is made to the copending application of James D. Billingsley and Dayton D. Eden, Ser. No. 023,221 filed Aug. 11, 1981.

Under control of the sensor microprocessor 30, information about the radiance values obtained at detectors 24 is processed in accordance with the method hereafter described. Microprocessor 30 determines the location of points on the modulator in a computer reference or "window" frame from which information sampled from the scene will appear stabilized despite relative motion between the telescope and the scene. Microprocessor 30 may be any conventional microprocessor capable of carrying out the arithmetic functions hereafter described. Microprocessor 30 processes data about current and previously observed radiance values, as well as information about the "window" frame coordinates from which transform data is generated to permit selected sample points in window frame coordinates to be transformed to modulator coordinates. The transform data along with selected sample points in window frame coordinates are then furnished to conventional interface electronics 32, where the window frame coordinates are transformed to modulator coordinates by simple arithmetic operations and appropriate signals are generated for commanding the modulator drive electronics 20 so that reflecting spots are written at the proper coordinates on the modulator 14. Interface electronics 32 contains conventional digital or analog circuitry for carrying out addition and multiplication operations necessary to make the coordinates transformation as well as conventional table lookup electronics necessary to generate the required control signals for the modulator drive electronics. The interfacing electronics 32 will send three separate control signals to the modulator drive electronics 20: a signal which turns the beam on and off, a signal which specifies the size of the spot and a signal which specifies the coordinates on the modulator at which the spot is to be written. The spot size, scanning times and synchronous sampling rates are all under the control of the sensor microprocessor 30.

Figure 2:
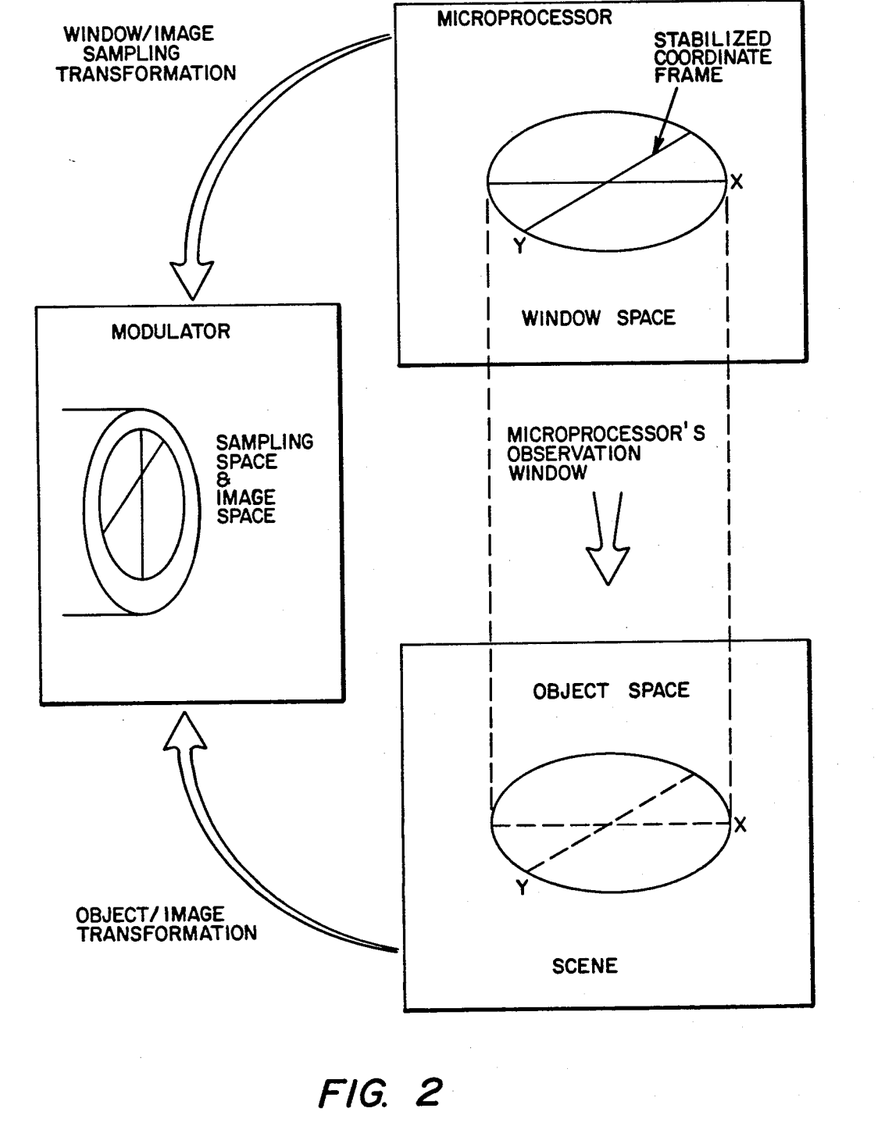
FIG. 2 is a schematic diagram illustrating the concept of the present invention.

Referring to FIG. 2, the operation of the present invention can now be understood by considering that at some initial time, a scene (in the object space) lies in the field of view of the telescope. At this instant, there is a one-to-one correspondence between points in the scene and images of these points within the field of view. Because any point in the scene is specified by three coordinates, a transformation between the object space and the image space maps a subset of three-dimensional Euclidean space into a subset of two-dimensional Euclidean space. However, unless the telescope remains fixed in position and attitude relative to the scene, the image of each observed point will move about in the modulator coordinate frame. Moreover, incremental motion of different image points will be different depending upon the character of the relative motion. For example, if the motion of the telescope consists of a simple roll about the optical axis, points on one side of the axis will move up, while points on the other side will move down. Moreover, the magnitude of the observed motion is proportional to the distance from the axis. If the modulator or image frame moves toward the earth, the image points will move outwardly of the origin in the modulator frame at rates dependent upon their distance from the origin. Generally speaking, motion in the image frame is considerably complex and it can be seen that components of translation, rotation and changes in scale (magnification or minification) are required to describe image motion.

Figure 3A:
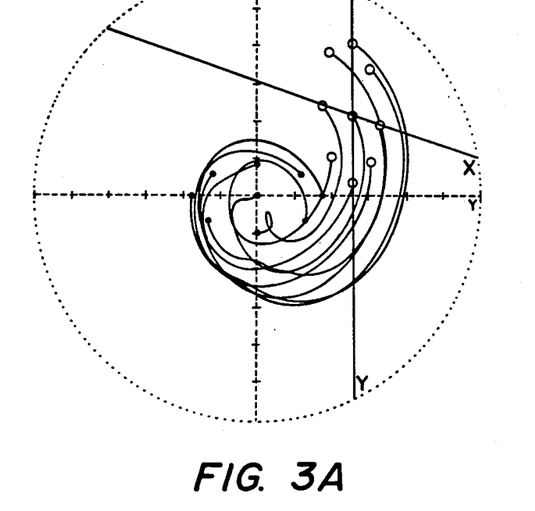
FIG. 3A is a graphical representation of the motion of selected scene points in the modulator frame.

FIG. 3A illustrates the distortion of an image which occurs over time when a telescope is moving relative to the scene. The closed dots represent the position of nine points distributed about the origin of the modulator coordinate system ($X_m$, $Y_m$) at some initial time $t_o$; the open dots represent the position of each of the nine points after some period of time t. The lines connecting the closed and open circles represent the motion of each of the respective points in the modulator frame or image space over time t. As shown in FIG. 3A, the image of the nine points is distorted after time t due to the relative motion between the scene and the telescope. The six degrees of sensor motion include three translational degrees of freedom, X, Y, and Z, and three rotational degrees of freedom, pitch, yaw and roll about the optical axis.

Figure 3B:
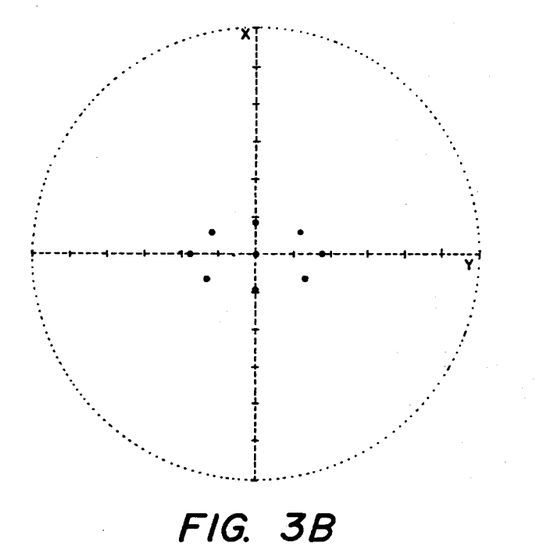
FIG. 3B is a graphical representation of the motion of the same selected scene points in the stabilized reference frame of the microprocessor.

FIG. 3B illustrates the position of the nine points in stabilized window frame in the computer at times $t_o$ and t. As shown in FIG. 3B, the image of the nine points appears stationary. While the sensor microprocessor 30 keeps track of what occurs at the modulator by means of the computational window frame, transformation is required between the window frame coordinates and image frame coordinates if points in the window frame are to be accessed on the modulator.

The image stabilization procedure of the present invention can be seen as establishing a computational reference window frame in the sensor microprocessor in which the coordinates of the image of fixed points in space do not change in time. Transformation is required from the stabilized window frame to the modulator frame because the scene processing clearly must access the modulator. The capacity to access arbitrary points on the thermoptic modulator at high speeds makes image stabilization procedures feasible.

The mathematical development of the image stabilization procedure will now be described. Vectors are represented by lower case Roman or Greek letters, with a bar (—) below each letter. Matrices are represented by upper case Roman or Greek letters.

A general description of the transformation between object space to image space can be written as follows:

$$y_1(t) = \beta(t) + B(t)z \quad (1)$$

where $\beta$ (t) is a two-dimensional column vector,

B(t) is a 2×2 non-singular matrix, z is a two-dimensional column vector that denotes a point in object space, and $y_1(t)$ is a two-dimensional column vector which provides x and y coordinates of the image of z (t).

Similarly, a transformation from window space to image space can be written as follows:

$$y_2(t) = \alpha(t) + A(t)x \quad (2)$$

Where $\alpha$ (t) is a two-dimensional column vector,

A(t) is a 2×2 non-singular matrix, x is a two-dimensional column vector that denotes a fixed point in window space, and $y_2(t)$ is the two-dimensional mathematical image of x in the "real" image space.

The transformation from window space to object space is obtained by equating $y_1$ to $y_2$, then solving for z (t). z is a function of time because some residual relative motion exists between the window frame and the object frame. This motion is sensed and nulled by change in the window frame parameters on the modulator. This yields:

$$z(t) = B^{-1}(t)[A(t)x + \alpha(t) - \beta(t)] \quad (3)$$

Equation (3) permits selection of a point in the computational window frame and have that point stationary in object space. Equation (2) provides the necessary intermediate step that properly locates the selected point on the modulator. The transformation of the window frame to the modulator using these equations produces a sampling frame that follows the motions and distortions of the image. Theoretically, A(t) and α(t) can be determined from the rotational and translational motion of the telescope. More importantly, however, A(t) and α(t) can be determined from observations of the scene. Thus, direct knowledge of the sensor's motion is not needed to stabilize the scene and sampling process.

Stabilization is possible by observing and nulling z in a closed loop control process that reproduces the window frame velocity components on the modulator. The representation of a fixed window frame on the modulator requires variation of six independent parameters: y axis location, rotation angle and scale and x axis location, rotation angle and scale. The representation of the window frame on the modulator and the corresponding representation of the object frame on the modulator (as the image) is anamorphic, nonorthogonal and nonstationary.

The representation of the window frame on the modulator is as a moving frame. However, the moving frame can be regarded as fixed and the object frame as moving. Since equations (1), (2) and (3) represent affine transformations, it can be shown from the theory of Lie Groups that:

$$-\frac{\partial z}{\partial t} = \Sigma \mu_i(t) X_i z \quad (4)$$

for a suitable choice of $\mu_1, \mu_2 \ldots$ where $X_1, X_2 \ldots$ are the infinitesimal generators of the motion. The parameters $\mu_i$ are derived from the detected radiance values.

It can be shown from equations (3) and (4) that:

$$\Sigma \mu_i X_i z = B^{-1} A(\mu + Mx) \quad (5)$$

$$\text{where } \mu = \begin{pmatrix} \mu_1 \\ \mu_2 \end{pmatrix}, M = \begin{pmatrix} \mu_3 & \mu_5 \\ \mu_4 & \mu_6 \end{pmatrix}$$

$$X_1 = \frac{\partial}{\partial x}, X_2 = \frac{\partial}{\partial y}, X_3 = x\frac{\partial}{\partial x}, X_4 = x\frac{\partial}{\partial y}, X_5 = y\frac{\partial}{\partial x} \quad (6)$$

$$\text{and } X_6 = y\frac{\partial}{\partial y}$$

$$x = \begin{pmatrix} x \\ y \end{pmatrix}, \text{ so } \frac{\partial}{\partial x}\alpha = \frac{\partial}{\partial y}\alpha = \frac{\partial}{\partial x}\beta = \frac{\partial}{\partial y}\beta = 0$$

Using (3) and (6), the left-hand side of (5) becomes $$\sum_{i=1}^{6} \mu_i X_i z =$$

$$B^{-1}A \left( \mu_1 \begin{pmatrix} 1 \\ 0 \end{pmatrix} + \mu_2 \begin{pmatrix} 0 \\ 1 \end{pmatrix} + \mu_3 \begin{pmatrix} x \\ 0 \end{pmatrix} + \mu_4 \begin{pmatrix} 0 \\ x \end{pmatrix} + \mu_5 \begin{pmatrix} y \\ 0 \end{pmatrix} + \mu_6 \begin{pmatrix} 0 \\ y \end{pmatrix} \right)$$

The above can be rewritten as $$\sum_{i=1}^{6} \mu_i X_i z = B^{-1}A \left[ \begin{pmatrix} \mu_1 \\ \mu_2 \end{pmatrix} + \begin{pmatrix} \mu_3 & \mu_5 \\ \mu_4 & \mu_6 \end{pmatrix} \begin{pmatrix} x \\ y \end{pmatrix} \right]$$

which is seen to be equation (5) given the previous definitions of $\mu$, M and x.

The basic equations needed to obtain the principal result can be written as follows:

$$-\dot{z} = B^{-1}(\Lambda_B - \Lambda_A)Ax + B^{-1}[\lambda_B - \lambda_A + (\Lambda_B - \Lambda_A)\alpha] \quad (7)$$

$$\text{where } \Lambda_A = \dot{A}A^{-1}, \lambda_A = \dot{\alpha} - \Lambda_A\alpha \quad (8)$$

$$\Lambda_B = \dot{B}B^{-1}, \lambda_B = \dot{\beta} - \Lambda_B\beta$$

Equation (7) is obtained by formally differentiating equation (3) with respect to t:

$$\dot{z} = B^{-1}(\dot{A}x + \dot{\alpha} - \dot{\beta}) + \dot{B}^{-1}(Ax + \alpha - \beta)$$

The term involving $A\dot{x}$ is equal to 0, because the window frame is chosen to be a time independent reference frame.

The expression for $\dot{B}^{-1}$ can be put in more suitable form as follows:

From $BB^{-1} = I$, differentiation with respect to time yields:

$$B\left(\frac{d}{dt}B^{-1}\right) + \left(\frac{d}{dt}B\right)B^{-1} = 0, \text{ so } \frac{d}{dt}B^{-1} = -B^{-1}\dot{B}B^{-1}$$

The above expression for $\dot{z}$ can now be written as $$\dot{z} = B^{-1}(\dot{A}x + \dot{\alpha} - \dot{\beta}) - B^{-1}\dot{B}B^{-1}(Ax + \alpha - \beta) = $$
$$B^{-1}(\dot{A} - \dot{B}B^{-1}A)x + B^{-1}(\dot{\alpha} - \dot{\beta} - \dot{B}B^{-1}\alpha + \dot{B}B^{-1}\beta) = $$
$$B^{-1}[\dot{A}A^{-1} - \dot{B}B^{-1}]Ax + $$
$$B^{-1}[\dot{\alpha} - (\dot{B}B^{-1} - \dot{A}A^{-1})\alpha - \dot{A}A^{-1}\alpha - \dot{\beta} + \dot{B}B^{-1}\beta]$$

Using the definitions of equation (8), it follows that:

$$\dot{z} = B^{-1}(\Lambda_A - \Lambda_B)Ax + B^{-1}[\lambda_A - \lambda_B + (\Lambda_A - \Lambda_B)\alpha]$$

It is seen that negating all terms in the previous equation yields equation (7).

By equating equations (5) and (7) as indicated by equation (4), and comparing like terms, the following results are obtained:

$$B^{-1}AM = B^{-1}(\Lambda_B - \Lambda_A)A$$

and $$B^{-1}A\mu = B^{-1}[\lambda_B - \lambda_A + (\Lambda_B - \Lambda_A)\alpha]$$

If the first equation is solved for $\Lambda_B - \Lambda_A$ and the second equation solved for $\lambda_B - \lambda_A$, there results:

$$\Lambda_B - \Lambda_A = AMA^{-1}$$

$$\lambda_B - \lambda_A = A\mu - AMA^{-1}\alpha \quad (9)$$

To determine the generalized velocities, $\mu_1, \mu_2 \ldots \mu_6$, observations of radiance values in the object space must be made, rather than coordinates of z. $\mu$ and M can be found from radiance values. Thus, let F (t, x) be any contrast feature observed in the window frame. Then it can be shown that:

$$-\frac{\partial F}{\partial t} = \Sigma \mu_i(t) X_i F \quad (10)$$

Given that the infinitesimal generators $X_1 X_2 \ldots X_n$ are the same, the $\mu_i$ of equations (4) and (10) are identical. These $\mu_i$ do not depend upon the particular point being observed, but are spatially invariant over the scene.

As earlier stated, the stabilization of images seen by the modulator requires the $\alpha$ vector and the A matrix in equation (2) to be determined so that conversion can be made from window space to image space or back again. The observable data F (t, x) are radiance observations of points in object space. Thus, the time and spatial derivatives specified by equation (10) pertain to rates of change of observed radiance values.

Figure 4:
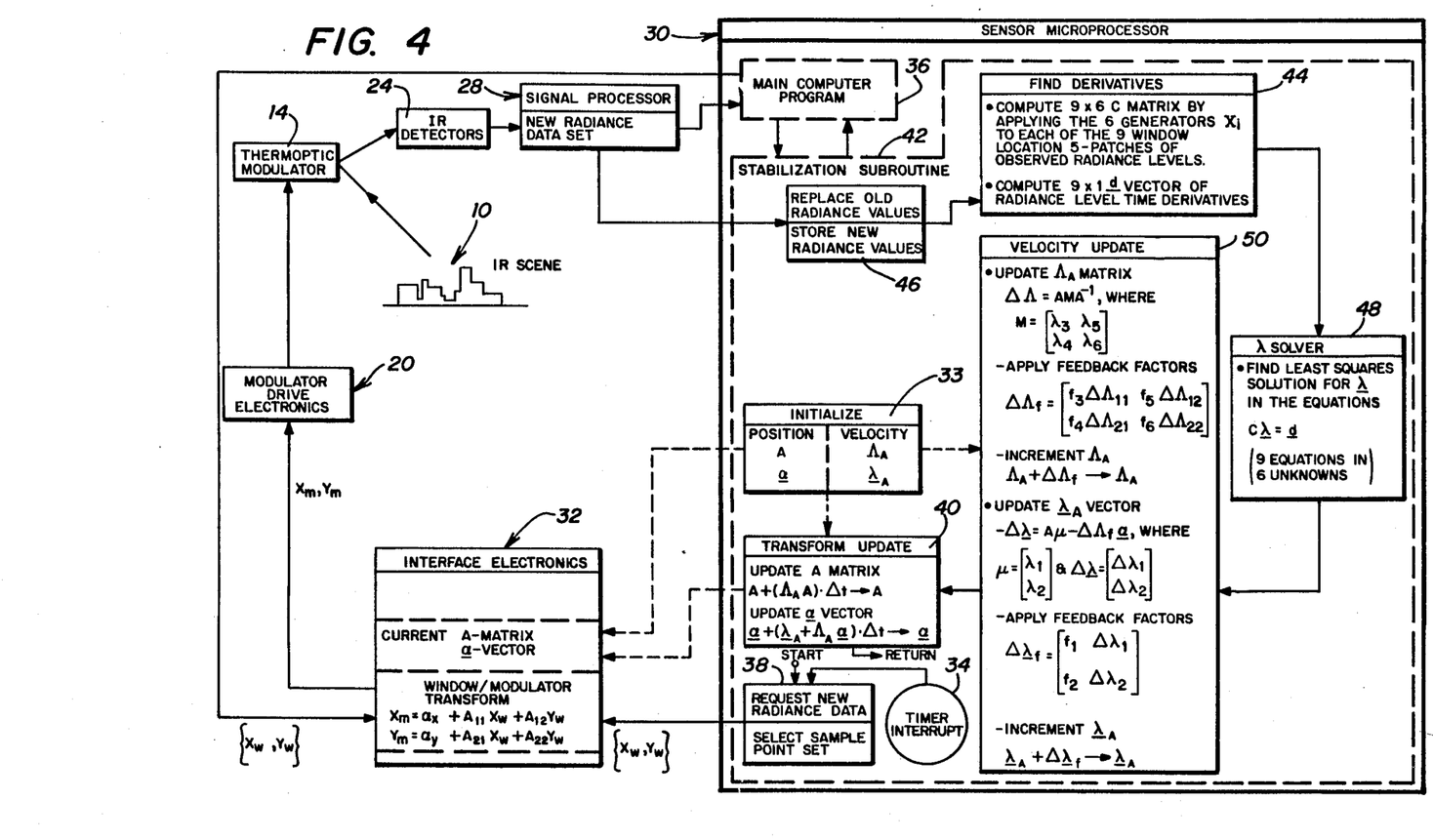
FIG. 4 is a flow diagram described steps of the present invention.

The procedure for obtaining $\alpha$ and A is now described by reference to FIG. 4 in which the components of the dark field telescope and the functional features of the stabilization subroutine under the control of the main program of the microprocessor are shown schematically. Since the six parameter algorithm requires not only current but previously obtained radiance values, some startup procedure is necessary when the stabilization routine is started and prior observations are not available.

In the startup procedure, the values $\alpha$, A, $\lambda_A$ and $\Lambda_A$ are initialized as shown by the block 33. It is assumed that at time $t=0$, the transformation from window to image space is the identity transformation.

$$\alpha_o = \begin{pmatrix} 0 \\ 0 \end{pmatrix} \text{ and } A_o = \begin{pmatrix} 1 & 0 \\ 0 & 1 \end{pmatrix}$$

Figure 5:
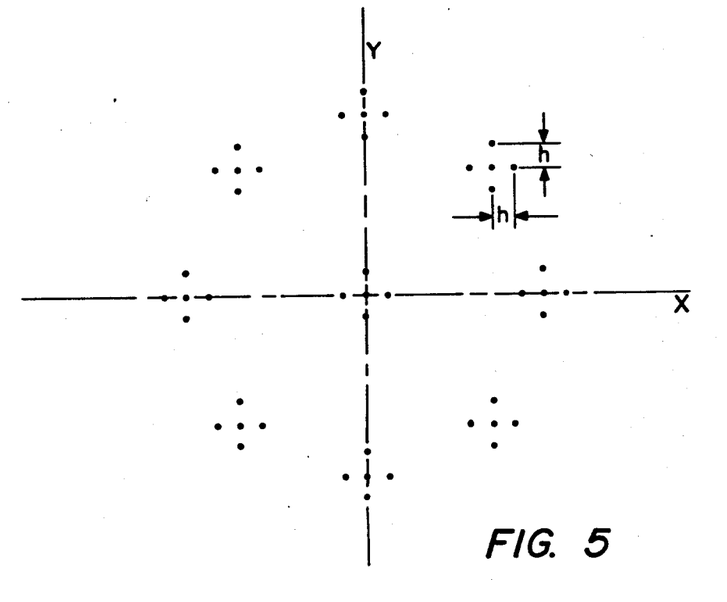
FIG. 5 is a possible configuration of sample points in the stabilized reference frame of the microprocessor.

Thus, $\lambda_A$ and $\Lambda_A$ are initially set to zero, because no a priori knowledge is assumed to infer time rates of change of the scene. This results in an initial lag or startup transient, before scene lock is established. These initialized values are fed from microprocessor 30 to the interface electronics 32 where these values will be used to obtain coordinates on the modulator which can be accessed by the electron gun 21. The main program 36 executed by the microprocessor 30 requests start of the stabilization subroutines at 38 by choosing a sample point set in the window frame. FIG. 5 shows one possible sample point set. These sample point coordinates are then fed to the interface electronics 32 where the coordinates are transformed to coordinates in the modulator frame. In the startup procedure, the above values of $\alpha_o$ and $A_o$ make the modulator coordinates the same as those in the window frame.

In the next step, an initial sample of radiance values is obtained by writing a set of reflecting spots on the modulator at the modulator coordinates corresponding to each point in the sample set and observing the radiance value for each sample point at the detectors 24.

The objective of the sampling is to provide data used in equation (10) to determine values for $\mu_1, \mu_2, \ldots \mu_6$. Because the number of unknown $\mu_i$ is six, a solution requires at least six distinct sample sets in the window coordinate frame. In the preferred embodiment, nine sampling sets are used from which the $\mu_i$ are determined by a method of least squares. The nine sampling sets in the window frame are shown in FIG. 5. It is understood, of course, that if the telescope is moving relative to the scene, the set will be represented differently in the modulator frame. It can be seen in FIG. 5 that in the preferred embodiment, the nine central sampling sets comprise a first sampling set at the origin and eight additional sampling sets equally spaced on a circle centered at the origin. Within a sampling set, the vertical and horizontal separation between adjacent points is represented by the distance "h".

The central point of each set in FIG. 5 is used to obtain time derivatives required by the left-hand side of equation (10). The surrounding points are used to obtain spatial derivatives required by the right-hand side of equation (10). Thus, radiance values are observed at five separate points for each sample set. Stated differently, a set of observations consists of 45 individual radiance values obtained by rapidly writing the 45 reflecting spots in series. The configuration of sampling points in the window frame is shown in FIG. 5.

In the next step of the startup procedure, new values for $\alpha$ and A are now computed. Integration by the Euler method procedure results in incrementing A by $\Lambda_A \cdot A \cdot \Delta t$ and incrementing $\alpha$ by $(\lambda_A + \Lambda_A \cdot \alpha) \Delta t$. This step is represented at 40 by the block entitled "TRANSFORM UPDATE". Generating new values for $\alpha$ and A is equivalent to moving the window frame relative to the modulator frame. Because in starting up, $\Lambda_A$ and $\lambda_A$ are initialized to zero, this procedure yields no change in $\alpha$ and A. Thus, $\alpha_1 = \alpha_0$ and $A_1 = A_0$. However, when initial estimates are available for $\Lambda_A$ and $\lambda_A$, scene track lock can be achieved more quickly. For example, if the position and velocity of the telescope are known, together with the attitude, this information will be used to initialize $\Lambda_A$ and $\lambda_A$ to non-zero values. Even if this information is imprecise, lock-on is more quickly achieved with non-zero values.

This completes the startup procedure and provides a set of radiance values which can be stored for use in determining the time derivatives of the radiance values obtained from the next set of observations.

Once a set of radiance values has been obtained, the six parameter algorithm for obtaining $\alpha$ and A may be executed by the stabilization subroutine 42.

In Step 1 of the algorithm, timer interrupt 34 causes a new sample of radiance values to be obtained by selecting a sample point set such as that shown in FIG. 5 and transmitting the coordinates of this point set to the interface electronics 32, where the appropriate modulator coordinates are determined and appropriate signals are generated for directing the modulator drive electronics 20 to write the reflecting spots on the modulator. The window frame coordinates of the sampling points will, in general, be different from the modulator frame coordinates of those same points (FIG. 5). The values of $\alpha$ and A are used to determine the coordinates of the sample points in the modulator from the coordinates of the sample points in the window by equation (2). At block 40, the values of $\alpha$ and A are updated by applying the results of the sample measurements and stabilization computations.

In Step 2 of the algorithm, shown by the block 44 entitled "FIND DERIVATIVES," the time derivatives required by equation (10) are computed from current and preceding sets of radiance values; spatial derivatives require current values only. The current radiance values are processed by the signal processor and fed in digitized form to the sensor microprocessor 30. The previous set of radiance values, stored at 46, is used in determining the time derivatives of the radiance values. The time and spatial derivatives are then used to compute the nine equations in the six unknowns, $\mu_1, \mu_2, \ldots \mu_6$. These nine equations in six unknowns may be represented by the matrix equation:

$$C\lambda = d, \quad (11)$$

where C is a 9×6 matrix and d is a 9×1 vector. To see how each of the nine equations is found, consider a typical location such as shown in FIG. 5.

If $F(x_i, t)$ is the observed radiance at time t for the point $x_i$, $i = 1, 2, \ldots 9$, in the window space, the time derivative can be approximated as follows:

$$\frac{\partial F}{\partial t}(x_i, t) = \frac{F(x_i, t_k) - F(x_i, t_{k-1})}{\Delta t} \quad (12)$$

where $\Delta t = t_k - t_{k-1}$

The d vector in equation (11) consists of nine values obtained by equation (12).

$$d_{t_k} = \begin{bmatrix} \frac{\partial}{\partial t} F(x_1, t_k) \\ \frac{\partial}{\partial t} F(x_2, t_k) \\ \vdots \\ \frac{\partial}{\partial t} F(x_9, t_k) \end{bmatrix} \quad (13)$$

The spatial derivatives of the equation (10) are found as follows:

$$\frac{\partial F}{\partial x}(x_i, t_k) = \frac{F\left[\begin{pmatrix} x_i + h \\ y_i \end{pmatrix}, t_k\right] - F\left[\begin{pmatrix} x_i - h \\ y_i \end{pmatrix}, t_k\right]}{2h} \quad (14)$$

and $$\frac{\partial F}{\partial y}(x_i, t_k) = \frac{F\left[\begin{pmatrix} x_i \\ y_i + h \end{pmatrix}, t_k\right] - F\left[\begin{pmatrix} x_i \\ y_i - h \end{pmatrix}, t_k\right]}{2h}$$

For simplicity of notation, let $$\frac{\partial F}{\partial x}(x_i, t_k) = F_{x,i} \quad (15)$$

$$\frac{\partial F}{\partial y}(x_i, t_k) = F_{y,i}$$

Then the C matrix of equation (11) can be written:

$$C = \begin{bmatrix} F_{x,1} & F_{y,1} & x_1 F_{x,1} & x_1 F_{y,1} & y_1 F_{x,1} & y_1 F_{y,1} \\ F_{x,2} & F_{y,2} & x_2 F_{x,2} & x_2 F_{y,2} & y_2 F_{x,2} & y_2 F_{y,2} \\ \vdots & \vdots & \vdots & \vdots & \vdots & \vdots \\ F_{x,9} & F_{y,9} & x_9 F_{x,9} & x_9 F_{y,9} & y_9 F_{x,9} & y_9 F_{y,9} \end{bmatrix} \quad (16)$$

where $x_i = \begin{pmatrix} x_i \\ y_i \end{pmatrix}$

It can be seen that the time derivatives require the radiance values for the nine central locations to be saved at each sampling time, $t_k$, because when time is advanced by increment, $\Delta t$, the following replacements occur:

$$F(x_i, t_k) \rightarrow F(x_i, t_{k-1}) \text{ and } F(x_i, t_k + \Delta t) \rightarrow F(x_i, t_k)$$

The spatial derivatives, however, are computed from current radiance values such that only nine of the 45 total values must be saved from one sampling time to the next. These nine values then replace the previously saved radiance values. These replacement and store functions are indicated at block 46.

In the third step of the algorithm represented at 48 by the block entitled "λ SOLVER," the nine equations in six unknowns represented by equation (11) are solved for λ by a least squares algorithm. This is equivalent to finding $\mu$ and M, because $$\lambda = \begin{bmatrix} \mu_1 \\ \mu_2 \\ \mu_3 \\ \mu_4 \\ \mu_5 \\ \mu_6 \end{bmatrix} \quad (17)$$

That is, the values of $\mu_i$ in equation (17) are the same as those given for defining $\mu$ and M, following equation (5).

In Step 4, the $\lambda_A$ matrix and the $\lambda_A$ vector are now updated. This step is shown in FIG. 5 in block 50 entitled "VELOCITY UPDATE." From equation (9) it is seen that:

$$\Delta \Lambda = AMA^{-1} \quad (18)$$

Similarly, equation (9) shows that $$\Delta \lambda = A\mu - AMA^{-1}\alpha \quad (19)$$

Greater control of the response rate can be achieved by applying feedback factors to the increments calculated in equations (18) and (19). Thus, let $\Delta \Lambda$ and $\Delta \lambda$ be represented as follows:

$$\Delta \Lambda = \begin{pmatrix} \Delta \Lambda_3 & \Delta \Lambda_5 \\ \Delta \Lambda_4 & \Delta \Lambda_6 \end{pmatrix} \quad (20)$$

and $$\Delta \lambda = \begin{pmatrix} \Delta \lambda_1 \\ \Delta \lambda_2 \end{pmatrix} \quad (21)$$

The subscripts in the two equations above are used to correspond to those in the definitions of $\mu$ and M that follow equation (5). Six feedback factors are provided as preloads, say, $f_i$, $i = 1, 2, \ldots 6$. These $f_i$ can be determined mathematically from stability analysis of the particular system and experimentally modified for the particular system. The components of the $\Lambda_A$ matrix and $\lambda_A$ vector are replaced as follows:

$$\begin{aligned} \lambda_{A,1} + f_1 \Delta \lambda_1 &\rightarrow \lambda_{A,1} \\ \lambda_{A,2} + f_2 \Delta \lambda_2 &\rightarrow \lambda_{A,2} \\ \Lambda_{A,3} + f_3 \Delta \Lambda_3 &\rightarrow \Lambda_{A,3} \\ \Lambda_{A,4} + f_4 \Delta \Lambda_4 &\rightarrow \Lambda_{A,4} \\ \Lambda_{A,5} + f_5 \Delta \Lambda_5 &\rightarrow \Lambda_{A,5} \\ \Lambda_{A,6} + f_6 \Delta \Lambda_6 &\rightarrow \Lambda_{A,6} \end{aligned} \quad (22)$$

In the last step of the algorithm, represented by block 40, the $\alpha$ vector and the A matrix are updated from the newly computed values of $\Delta \Lambda$ and $\Delta \lambda$ by applying equation (8). This step is outlined in the block entitled "TRANSFORM UPDATE." As a consequence of computing updated values of $\Lambda_A$ and $\lambda_A$, the window frame may be moved relative to the modulator frame by recomputing the coordinates of the window space sample points in image space using A and α and equation (2). Thus, from $\Lambda_A = \dot{A}A^{-1}$ it follows that:

$$\dot{A} = \Lambda_A A \quad (23)$$

Similarly, from $\lambda_A = \alpha - \Lambda_A \alpha$, one obtains $$\dot{a} = \lambda_A + \Lambda_A \alpha \quad (24)$$

The integration can be done by the simple Euler method, yielding $$A + \dot{A} \cdot \Delta t \rightarrow A \quad (25)$$

Equivalently, the value of A is incremented by $\Delta t$ Similarly, $$a + \dot{a} \cdot \Delta t \rightarrow a \quad (26)$$

This means that the value of α is incremented by $(\alpha \cdot \Delta t)$

The updated values of A and α are now furnished to the interface electronics 32. At this point subroutine 42 is terminated and control is returned to the main program 36. Equation (2) is now used in the interface electronics 32 to transform the desired sampling locations in window coordinates to modulator coordinates. The main program can now acquire images of the scene by selecting sampling points in window coordinates that define the pattern to be used to obtain the image. These sample points having coordinates in the window frame are then transferred into modulator coordinates such that a scene element reflected from the modulator at these modulator coordinates will appear stabilized in the window frame during relative motion between the telescope and the scene. The algorithm described above is now repeated, controlled by the timer interrupt 34, starting with the acquisition of a new set of radiance values.

Thus, the above procedure provides a method for stabilizing the images in the sensor microprocessor's frame of reference. Of course, other stabilization procedures can be derived to accomplish the same result and other thermoptic materials may be employed to detect sample scene radiance values at other wavelengths, including wavelengths in the visible.

Although particular embodiments of the invention have been illustrated in the drawings and described herein, it is understood that the invention is not limited to the embodiments disclosed but is capable of rearrangement, modification and substitution of parts and elements without departing from the spirit of the invention.

We claim:

1. A method for stabilizing images in a computer reference frame for a telescope moving relative to a scene, comprising the steps of:
   (a) sampling radiance values of the scene reflected from spots written on a thermoptic modulator for a selected set of points having fixed coordinates in the reference frame;
   (b) processing information about the reference frame coordinates of the points in step (a), the radiance values obtained in step (a) and stored radiance values obtained from a preceding set of observations to obtain transform data representing motion of the image from the scene caused by the relative motion of the telescope to the scene;
   (c) selecting a set of points having the same coordinates in the reference frame as the set in step (a) to obtain the next set of radiance values;
   (d) transforming coordinates of the points selected in step (c) to modulator coordinates from the transform data obtained in step (b); and
   (e) writing reflective spots on a thermoptic modulator at the modulator coordinates obtained in step (d) to acquire a new set of radiance values.

2. The method of claim 1 further comprising the step of:
   (f) storing selected radiance values obtained in step (a).

3. A method for stabilizing images in a computer reference frame for an infrared telescope moving relative to a scene, comprising the steps of:
   (a) sampling radiance values of the scene reflected from spots written on a thermoptic modulator for a selected set of points in the scene having fixed coordinates in the reference frame;
   (b) processing information about the reference frame coordinates of the points in step (a), the radiance values obtaned in step (a) and stored radiance values from a preceding set of observations to obtain transform data representing the motion of the image from the scene caused by relative motion of the telescope to the scene;
   (c) selecting a set of points having the same coordinates in the reference frame as the set in step (a) to be sampled;
   (d) transforming coordinates of the points selected in step (c) to modulator coordinates from the transform data obtained in step (b);
   (e) writing reflective spots on the thermoptic modulator at the modulator coordinates obtained in step (d) to acquire a new set of radiance values;
   (f) storing selected radiance values obtained in step (a);
   (g) using the transform data obtained in step (b) to transform a subsequent image into reference frame coordinates such that said image will appear stabilized in the reference frame despite relative motion between the telescope and the scene; and
   (h) repeating steps (a) through (f) after a predetermined time interval.

4. A method for stabilizing images in a computer reference frame for an infrared telescope moving relative to a scene being viewed, comprising the steps of:
   (a) storing selected radiance values from a set of observations made of the scene;
   (b) subsequently obtaining a current set of radiance values by writing a series of reflecting spots at predetermined coordinates on a normally nonreflecting thermoptic modulator to reflect radiance values from the scene;
   (c) computing the time rate of change of the radiance values at selected sampling points in the reference frame by comparing said radiance values with said stored radiance values in step (a);
   (d) Computing the spatial rate of change of said current radiance values from the current set of radiance values obtained in step (b);
   (e) determining from the time and spatial rates of change in the radiance values computed in steps (c) and (d), the coordinates of reflective spots to be written on the thermoptic modulator such that images selectively reflected from said spots and subsequent images appear stabilized in the reference frame under conditions of relative motion between the telescope and the screen; and (f) repeating steps (a) through (e) after a predetermined interval.

5. In a forward or down looking telescope moving relative to a scene being viewed, apparatus for stabilizing the image of the scene in a reference frame, having stabilized reference frame coordinates, comprising:

a thermoptic modulator disposed at the image plane of the telescope for imaging optical energy from the scene, said modulator being normally nonreflective of energy incident thereon, but capable of having reflective spots written at selected coordinates thereon to reflect a portion of the scene incident at said coordinates;

a detector means positioned to detect optical energy reflected from said spots written on said modulator, said detector means providing an output signal representing the radiance detected at said modulator coordinates;

processing means connected to said detector means responsive to said output signal for computing transform information about transformation from the stabilized reference frame coordinates to coordinates on said modulator, said processing means generating a first signal representing said transform information;

sampling means for selecting spots to be written on said modulator at selected coordinates such that the image will appear stabilized in the reference frame, said processing means generating a second signal representing coordinates of said spots in the stabilized reference frame;

transform means responsive to said first and said second signals for transforming coordinates represented by said first signal to coordinates on said modulator; and means connected to said transform means for writing reflecting spots on said modulator at said modulator coordinates.

6. The apparatus of claim 5 wherein said modulator includes:

at least one vanadium dioxide thin film for modulating optical information at wavelengths in the infrared.

7. The apparatus of claim 5 wherein a series of reflecting spots are written on said modulator in rapid succession to generate a set of observations at selected coordinates in the reference frame.

8. The apparatus of claim 5 wherein said detector means includes an array of infrared detectors responsive to optical information at wavelengths in the infrared.

9. The apparatus of claim 5 wherein said processing means includes:

a storage means for storing radiance values obtained from a previous set of observations; and means for comparing radiance values obtained from a current set of observations with said stored radiance values to detect the time rate of change of said radiance values.

10. The apparatus of claim 9 wherein said processing means includes:

means for computing spatial rates of change of said current radiance values.

11. The apparatus of claim 9 wherein said processing means includes:

means for computing time rates of change of said current radiance values.

12. The apparatus of claim 9 further comprising:

integrating means for obtaining transform information from said time rate of change.

13. The apparatus of claim 5 wherein said writing means includes a cathode ray tube.

14. In a forward looking or down looking infrared receiver moving relative to a scene being viewed, apparatus for stabilizing the image of the scene in the reference frame of the receiver comprising:

an infrared modulator disposed in the image plane of the receiver for imaging infrared energy from the scene, said modulator being normally nonreflecting of infrared energy, but capable of having reflecting spots written at selected coordinates to reflect infrared energy incident at said coordinates;

an infrared detector positioned to detect the infrared energy reflected from spots written on said modulator, said detector providing an output signal representing the radiance of the energy detected at said spots;

processing means connected to said detector and responsive to said output signal for computing transform information about the transformation from stabilized reference frame coordinates to coordinates on the modulator, said processing means generating a first signal representing said transform information;

sampling means for selecting spots to be written on said modulator such that the image will appear stabilized in the receiver reference frame, said sampling means generating a second signal representing coordinates in the reference frame of spots to be written on said modulator;

transform means responsive to said first and said second signals for transforming coordinates represented by said second signal to coordinates on said modulator; and control means connected to said transform means for writing reflecting spots on said modulator at said modulator coordinates.

15. The apparatus of claim 14 wherein said modulator contains a vanadium dioxide thin film maintained below the transition temperature of said films.

16. The apparatus of claim 14 wherein said modulator generates a set of observations of the scene by writing a series of reflecting areas at predetermined coordinates on said modulator in rapid succession.

17. The apparatus of claim 16 wherein said processing means includes:

a storage means for storing infrared information obtained from a first set of observations of the scene; and means for comparing infrared information obtained from a second set of observations of the scene with said stored information to detect the time rate of change of said information.

18. The apparatus of claim 17 wherein said processing means includes:

means for detecting spatial changes in said infrared information from said second set of observations.

19. The apparatus of claim 17 wherein said processing means includes:

means for computing information about the time rate of change in infrared information from said second set of observations.

20. The apparatus of claim 17 further comprising:

integrating means for integrating said time rates of change to obtain transform information.

21. The apparatus of claim 14 wherein said control means includes a cathode ray tube.

22. The apparatus of claim 14 wherein said control means includes a scanable laser.

* * * * *